United States Patent
Qiu et al.

(10) Patent No.: US 12,524,169 B2
(45) Date of Patent: Jan. 13, 2026

(54) FPGA-BASED MASK MATCHING METHOD AND SYSTEM

(71) Applicant: HANGZHOU XINQI ELECTRONIC TECHNOLOGY CO., LTD, Hangzhou (CN)

(72) Inventors: Jiangang Qiu, Hangzhou (CN); Gang Chen, Hangzhou (CN); Bin Ma, Hangzhou (CN); Yuechao Zhang, Hangzhou (CN)

(73) Assignee: HANGZHOU XINQI ELECTRONIC TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 19/112,735

(22) PCT Filed: Sep. 27, 2023

(86) PCT No.: PCT/CN2023/122254
§ 371 (c)(1),
(2) Date: Mar. 18, 2025

(87) PCT Pub. No.: WO2024/067746
PCT Pub. Date: Apr. 4, 2024

(65) Prior Publication Data
US 2026/0003518 A1    Jan. 1, 2026

(30) Foreign Application Priority Data
Sep. 28, 2022   (CN) .......................... 202211189913.3

(51) Int. Cl.
*G06F 3/06*      (2006.01)
(52) U.S. Cl.
CPC .......... *G06F 3/0625* (2013.01); *G06F 3/0629* (2013.01); *G06F 3/0673* (2013.01)

(58) Field of Classification Search
CPC ..... G06F 3/0625; G06F 3/0629; G06F 3/0673
See application file for complete search history.

(56) References Cited

U.S. PATENT DOCUMENTS 9,569,561 B2 *   2/2017   Wildman .......... G06F 16/90339
2018/0367364 A1 * 12/2018   Johansson ............... H04L 45/00

FOREIGN PATENT DOCUMENTS

| CN | 107818151 A | 3/2018 |
|----|-------------|--------|
| CN | 101286936 A | 10/2018 |

(Continued)

OTHER PUBLICATIONS

ISR for PCT/CN2023/122254 mailed Dec. 8, 2023.
Written Opinion for PCT/CN2023/122254 mailed Dec. 8, 2023.

*Primary Examiner* — Zhuo H Li
(74) *Attorney, Agent, or Firm* — Ladas & Parry LLP

(57) ABSTRACT

A FPGA-based mask matching method is disclosed. A mask and a configuration keyword are split into sets of sub-masks and sets of sub-configuration keywords. Mask operation is performed to obtain sets of masked sub-configuration keywords. Operation is performed on masked sub-configuration keyword to obtain a first Hash value and this is used as a storage address, to obtain a storage table in which sets of masked sub-configuration keywords are stored. A keyword in a packet is split into sets of sub-keywords, mask operation is performed on the sub-keyword and a sub-mask to obtain a masked sub-keyword. Hash operation is performed on sets of masked sub-keywords to obtain a plurality of second Hash values. The storage table is queried by the storage address corresponding to the second Hash value. If the corresponding masked sub-configuration keyword is consistent with the masked sub-keyword, it is determined that the packet hits a rule.

10 Claims, 3 Drawing Sheets

(56) References Cited

FOREIGN PATENT DOCUMENTS

| | | |
|---|---|---|
| CN | 108875064 A | 11/2018 |
| CN | 113660165 A | 11/2021 |
| CN | 115297056 A | 11/2022 |
| JP | 2019004398 A | 1/2019 |

* cited by examiner

FPGA-BASED MASK MATCHING METHOD AND SYSTEM

CROSS-REFERENCE TO RELATED APPLICATIONS

This application is an application under 35 U.S.C. 371 of International Application No. PCT/CN2023/122254 filed on 27 Sep. 2023 which claims priority to Chinese Application No. 202211189913.3 filed on 28 Sep. 2022. The content of these applications are incorporated herein by reference in their entirety.

TECHNICAL FIELD

The present invention relates to the field of communication technologies, and in particular, to an FPGA-based mask matching method and system.

BACKGROUND

When an IP packet is exchanged and routed during data network communication, matching or fuzzy matching and searching of some single bits needs to be performed on a segment of the IP packet. Through fuzzy searching, an actual use requirement can be met by using a small amount of rule data. In a network device such as a router, for each incoming data packet, relevant information is obtained from the data packet by setting a control rule of an access control list, and a manner of processing the data packet next, such as dropping or forwarding, is determined based on the set rule of the access control list.

A conventional router is generally implemented by using a hardware ternary content addressable memory (TCAM). The TCAM is configured to implement functions such as an ACL function and routing. According to a manner in which the TCAM searches data by using a hardware chip, all entries in a rule bank can be searched within one clock cycle and a search result is provided after a determined time cycle. Each bit in the TCAM may be set to three states: 0, 1, and x. A bit stored as x may be shielded from searching, to implement a mask matching function, so that the bit can not only perform precise matching and searching, but also perform fuzzy matching and searching. However, the TCAM is expensive to manufacture, a size of the rule bank that can be stored is limited, and there are a small quantity of entries in the access control list. As a result, a solution of implementing the ACL function by using the TCAM is expensive.

SUMMARY

An objective of the present invention is to provide an FPGA-based mask matching method and system, so that entries of an access control list are added, and costs can be reduced.

To achieve the foregoing objective, the present invention provides an FPGA-based mask matching method. The method includes:

obtaining a mask and a configuration keyword that are configured by a user, and respectively splitting the mask and the configuration keyword into a plurality of sets of sub-masks and a plurality of sets of sub-configuration keywords according to a same splitting format;

performing mask operation on each set of sub-configuration keywords with a corresponding set of sub-masks, to obtain a plurality of sets of masked sub-configuration keywords;

performing Hash operation on each set of masked sub-configuration keywords to obtain a plurality of first Hash values, using each first Hash value as a storage address, and storing the set of masked sub-configuration keywords in storage space corresponding to the storage address, to obtain a storage table in which the plurality of sets of masked sub-configuration keywords are stored;

obtaining a keyword from a received packet, splitting the keyword into a plurality of sets of sub-keywords, performing mask operation on each set of sub-keywords with a corresponding set of sub-masks to obtain corresponding masked sub-keywords, and performing Hash operation on each set of masked sub-keywords to obtain a plurality of second Hash values; and querying the storage table by a storage address corresponding to each second Hash value, comparing a masked sub-configuration keyword corresponding to the storage address with the masked sub-keyword, and determining that the packet hits a rule if all the sets of masked sub-keywords are consistent with the corresponding masked sub-configuration keywords.

Preferably, each of the configuration keyword, the mask, and the keyword includes a source IP address, a destination IP address, a source port, a destination port, an IP protocol number, and a protocol version.

Preferably, a splitting step of splitting the configuration keyword into the plurality of sets of sub-configuration keywords according to the splitting format includes:

sequentially grouping the source IP addresses in ascending order of bit orders, using M1 bits of the source IP addresses as a set of source IP addresses, and sequentially putting each obtained set of source IP addresses into each corresponding set of sub-configuration keywords cyclically;

sequentially grouping destination IP addresses in descending order of bit orders, using M1 bits of the destination IP addresses as a set of destination IP addresses, and sequentially putting each obtained set of destination IP addresses into each corresponding set of sub-configuration keywords cyclically;

sequentially grouping the source ports in ascending order of bit orders, using M2 bits of the source ports as a set of source port addresses, and sequentially putting each obtained set of source port addresses into each corresponding set of sub-configuration keywords cyclically; and sequentially grouping the destination ports in descending order of bit orders, using M2 bits of the destination ports as a set of destination port addresses, and sequentially putting each obtained set of destination port addresses into each corresponding set of sub-configuration keywords cyclically.

Preferably, the splitting step includes:

setting to split the configuration keyword into four sets of sub-configuration keywords; and putting a first 8-bit value of the source IP address into a first set of sub-configuration keywords, putting a second 8-bit value of the source IP address into a second set of sub-configuration keywords, putting a third 8-bit value of the source IP address into a third set of sub-configuration keywords, putting a fourth 8-bit value of the source IP address into a fourth set of sub-configuration keywords, putting a fifth 8-bit value of the source IP address into the first set of sub-configuration keywords, and so on until all bit values of the source IP address are put into corresponding sets of sub-configuration keywords.

Preferably, the splitting step includes:

putting a sixteenth 8-bit value of the destination IP address into the first set of sub-configuration keywords, putting a fifteenth 8-bit value of the destination IP address into the second set of sub-configuration keywords, putting a fourteenth 8-bit value of the destination IP address into the third set of sub-configuration keywords, putting a thirteenth 8-bit value of the destination IP address into the fourth set of sub-configuration keywords, putting a twelfth 8-bit value of the destination IP address into the first set of sub-configuration keywords, and so on until all bit values of the destination IP address are put into corresponding sets of sub-configuration keywords.

Preferably, the splitting step includes:

putting a first 4-bit value of the source port into the first set of sub-configuration keywords, putting a second 4-bit value of the source port into the second set of sub-configuration keywords, putting a third 4-bit value of the source port into the third set of sub-configuration keywords, and putting a fourth 4-bit value of the source port into the fourth set of sub-configuration keywords; and putting a fourth 4-bit value of the destination port into the first set of sub-configuration keywords, putting a third 4-bit value of the destination port into the second set of sub-configuration keywords, putting a second 4-bit value of the destination port into the third set of sub-configuration keywords, and putting a first 4-bit value of the destination port into the fourth set of sub-configuration keywords.

Preferably, the splitting step includes:

putting a first 2-bit value of the IP protocol number into the first set of sub-configuration keywords, putting a second 2-bit value of the IP protocol number into the second set of sub-configuration keywords, putting a third 2-bit value of the IP protocol number into the third set of sub-configuration keywords, and putting a fourth 2-bit value of the IP protocol number into the fourth set of sub-configuration keywords; and putting the protocol version into all the four sets of sub-configuration keywords.

Preferably, the method further includes:

when a same first Hash value is obtained after Hash operation is performed on different masked sub-configuration keywords, using the first Hash value as the storage address, and sequentially storing the different masked sub-configuration keywords into the storage address respectively, where a same storage address stores N different masked sub-configuration keywords.

Preferably, a step of determining whether the packet hits the rule includes:

splitting the keyword in the packet into four sets of sub-keywords, respectively performing mask operation on the four sets of sub-keywords with corresponding sets of sub-masks to obtain four corresponding sets of masked sub-keywords, and performing Hash operation on the four sets of masked sub-keywords to obtain four second Hash values;

querying the storage table for a storage address that is the same as a first second Hash value, obtaining N masked sub-configuration keywords stored in the storage address, matching a sub-keyword corresponding to the first second Hash value with the N masked sub-configuration keywords one by one, and outputting a first set of hit identifiers if the sub-keyword corresponding to the first second Hash value is consistent with the masked sub-configuration keyword; and obtaining a second set of hit identifiers, a third set of hit identifiers, and a fourth set of hit identifiers by analogy, and determining that the packet hits the rule if the first set of hit identifiers, the second set of hit identifiers, the third set of hit identifiers, and the fourth set of hit identifiers are all outputted.

To achieve the foregoing objective, the present invention provides an FPGA-based mask matching system. The system includes:

a first splitting module, configured to obtain a mask and a configuration keyword that are configured by a user, and respectively split the mask and the configuration keyword into a plurality of sets of sub-masks and a plurality of sets of sub-configuration keywords according to a same splitting format;

an operation module, configured to perform mask operation on each set of sub-configuration keywords with a corresponding set of sub-masks, to obtain a plurality of sets of masked sub-configuration keywords;

a storage module, configured to perform Hash operation on each set of masked sub-configuration keywords to obtain a plurality of first Hash values, use each first Hash value as a storage address, and store the set of masked sub-configuration keywords in storage space corresponding to the storage address, to obtain a storage table in which the plurality of sets of masked sub-configuration keywords are stored;

a second splitting module, configured to obtain a keyword from a received packet, split the keyword into a plurality of sets of sub-keywords, perform mask operation on each set of sub-keywords with a corresponding set of sub-masks to obtain corresponding masked sub-keywords, and perform Hash operation on each set of masked sub-keywords, to obtain a plurality of second Hash values; and a matching module, configured to query the storage table by a storage address corresponding to each second Hash value, compare a masked sub-configuration keyword corresponding to the storage address with the masked sub-keyword, and determine that the packet hits a rule if all the sets of masked sub-keywords are consistent with the corresponding masked sub-configuration keywords.

In the present invention, a technical solution of implementing bit-level mask matching through an FPGA can implement a function of increasing a quantity of entries of an access control list; can replace a TCAM chip, thereby reducing costs, and reducing space for hardware PCB layout; and based on a splitting solution in the present invention, can save FPGA resources and support more mask types.

DETAILED DESCRIPTION

The present invention is described in detail below with reference with specific implementations shown in the accompanying drawings. However, the implementations do not limit the present invention. Any structural, method, or functional transformations made by a person of ordinary skill in the art according to the implementations shall fall within the protection scope of the present invention.

Figure 1:
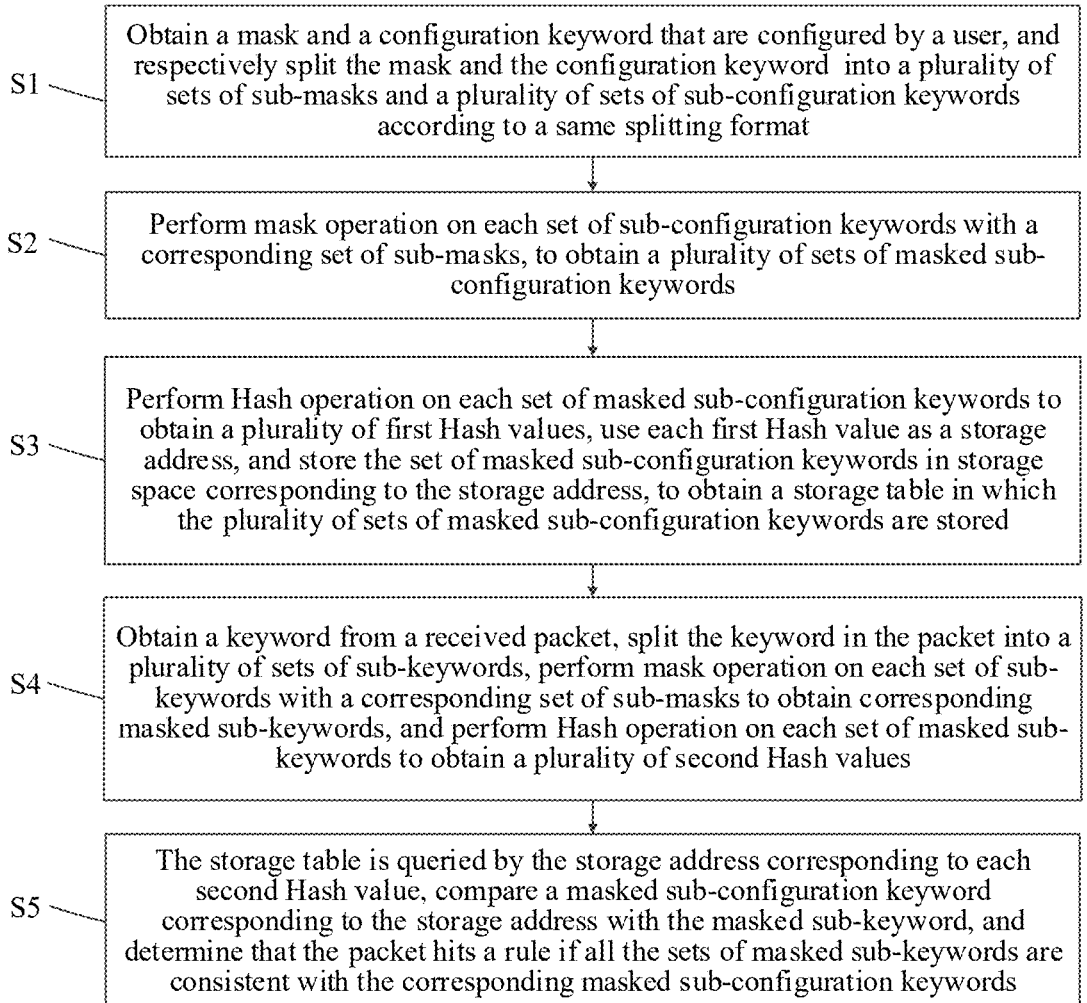
FIG. 1 is a schematic diagram of an FPGA-based mask matching method according to an embodiment of the present invention.

As shown in FIG. 1, in an embodiment of the present invention, the present invention provides an FPGA-based mask matching method. The method includes the following steps.

S1: Obtain a mask and a configuration keyword that are configured by a user, and respectively split the mask and the configuration keyword into a plurality of sets of sub-masks and a plurality of sets of sub-configuration keywords according to a same splitting format.

S2: Perform mask operation on each set of sub-configuration keywords with a corresponding set of sub-masks, to obtain a plurality of sets of masked sub-configuration keywords.

S3: Perform Hash operation on each set of masked sub-configuration keywords to obtain a plurality of first Hash values, use each first Hash value as a storage address, and store the set of masked sub-configuration keywords in storage space corresponding to the storage address, to obtain a storage table in which the plurality of sets of masked sub-configuration keywords are stored.

S4: Obtain a keyword from a received packet, split the keyword in the packet into a plurality of sets of sub-keywords, perform mask operation on each set of sub-keywords with a corresponding set of sub-masks to obtain corresponding masked sub-keywords, and perform Hash operation on each set of masked sub-keywords to obtain a plurality of second Hash values.

S5: The storage table is queried by the storage address corresponding to each second Hash value, compare a masked sub-configuration keyword corresponding to the storage address with the masked sub-keyword, and determine that the packet hits a rule if all the sets of masked sub-keywords are consistent with the corresponding masked sub-configuration keywords.

During actual use, there are generally 2 to 32 IP mask configuration types. Generally, mask types are some fixed types. For example, a mask is set based on a network segment. Therefore, in the present invention, bit-level mask matching is implemented by using an FPGA based on a quantity of mask configuration types.

The mask and the configuration keyword that are configured by the user are obtained, and the mask and the configuration keyword are respectively split into the plurality of sets of sub-masks and the plurality of sets of sub-configuration keywords according to the same splitting format. The mask and the configuration keyword that are configured by the user are obtained through a software command. The user may configure a variety of mask types and a variety of configuration keywords according to requirements and resource requirements. The configuration keyword includes a source IP address, a destination IP address, a source port, a destination port, an IP protocol number, and a protocol version. The mask includes a source IP address, a destination IP address, a source port, a destination port, an IP protocol number, and a protocol version.

Figure 2:
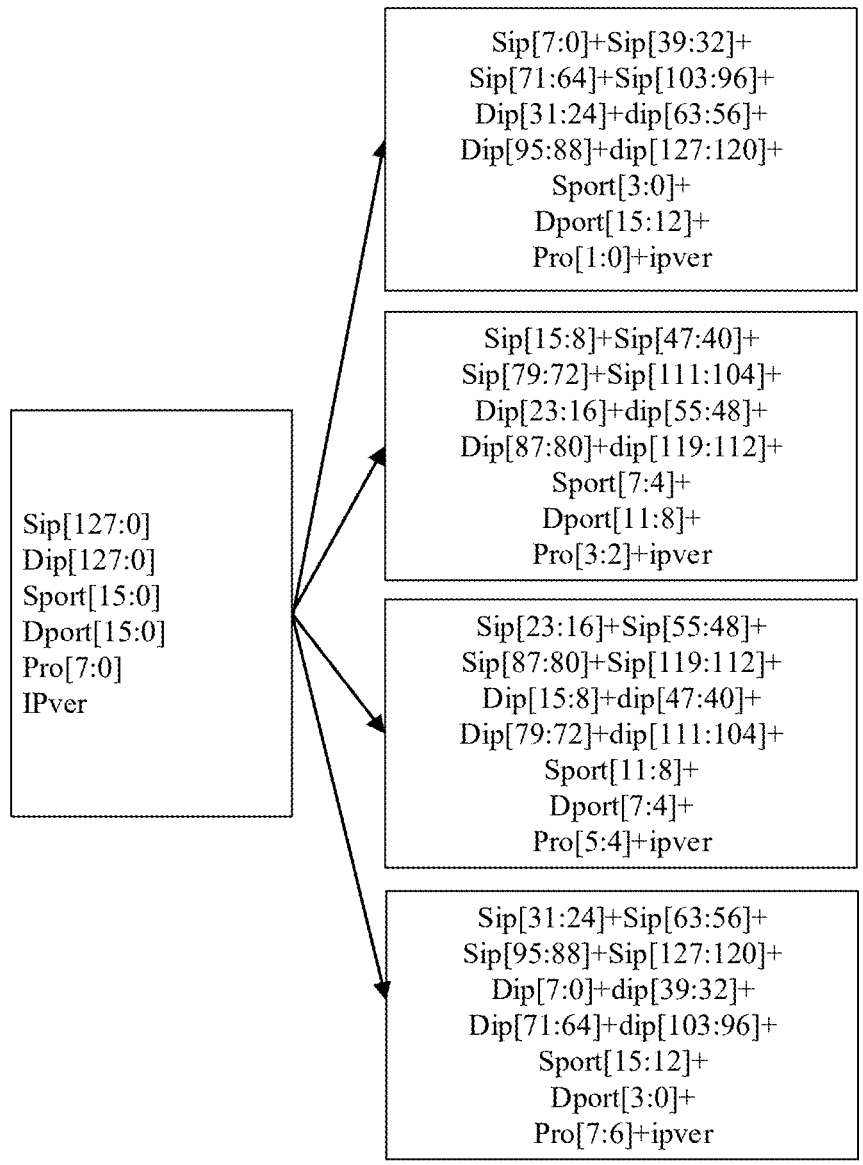
FIG. 2 is a schematic diagram of splitting a keyword according to an embodiment of the present invention.

The obtained mask and configuration keyword are respectively split according to the same splitting format, to obtain the plurality of sets of sub-masks and the plurality of sets of sub-configuration keywords. In an implementation of the present invention, the splitting format is described by using the configuration keyword as an example. Generally, the mask is used for a low segment of an IP address, and is mostly used for IPV4. Therefore, to support more mask types, the source IP addresses are grouped in ascending order of bit orders. The source IP addresses are sequentially grouped in ascending order of bit orders, M1 bits of the source IP addresses are used as a set of source IP addresses, and each obtained set of source IP addresses are sequentially put into each corresponding set of sub-configuration keywords cyclically. Destination IP addresses are sequentially grouped in descending order of bit orders, M1 bits of the destination IP addresses are used as a set of destination IP addresses, and each obtained set of destination IP addresses are sequentially put into each corresponding set of sub-configuration keywords cyclically. In an embodiment, the configuration keyword is set to be split into four sets of sub-configuration keywords. FIG. 2 is a schematic diagram of grouping of sub-configuration keywords. The configuration keywords include a source IP address Sip[127:0], a destination IP address Dip[127:0], a source port Sport[15:0], a destination port Dport[15:0], an IP protocol number Pro[7:0], and a protocol version Ipver, with a total of 297 bits. The source IP address Sip[127:0] is split. The source IP address Sip[127:0] has a total of 128 bits and is split in groups of 8 bits. A first 8-bit value Sip[7:0] of the source IP address is put into a first set of sub-configuration keywords, a second 8-bit value Sip[15:8] of the source IP address is put into a second set of sub-configuration keywords, a third 8-bit value Sip[23:16] of the source IP address is put into a third set of sub-configuration keywords, a fourth 8-bit value Sip[31:24] of the source IP address is put into a fourth set of sub-configuration keywords, a fifth 8-bit value Sip[39:32] of the source IP address is put into the first set of sub-configuration keywords, . . . , and a sixteenth 8-bit value Sip[127:120] of the source IP address is put into the fourth set of sub-configuration keywords until all bit values of the source IP address are put into corresponding sets of sub-configuration keywords. The destination IP address Dip[127:0] has a total of 128 bits and is split in groups of 8 bits. A manner of splitting the destination IP address is opposite to the manner of splitting the source IP address. The destination IP addresses are sequentially grouped in descending order of bit orders. A sixteenth 8-bit value Dip[127:120] of the destination IP address Dip[127:0] is put into the first set of sub-configuration keywords, a fifteenth 8-bit value Dip[119:112] of the destination IP address is put into the second set of sub-configuration keywords, a fourteenth 8-bit value Dip[111:104] of the destination IP address is put into the third set of sub-configuration keywords, a thirteenth 8-bit value Dip[103:96] of the destination IP address is put into the fourth set of sub-configuration keywords, a twelfth 8-bit value Dip[95:88] of the destination IP address is put into the first set of sub-configuration keywords, . . . , and a first 8-bit value Dip[7:0] of the destination IP address is put into the fourth set of sub-configuration keywords until all bit values of the destination IP address are put into corresponding sets of sub-configuration keywords. The source ports are sequentially grouped in ascending order of bit orders, M2 bit values of the source ports are used as a set of source port addresses, and each obtained set of source port addresses are sequentially put into each corresponding set of sub-configuration keywords cyclically. The destination ports are sequentially grouped in descending order of bit orders, M2 bit values of the destination ports are used as a set of destination port addresses, and each obtained set of destination port addresses are sequentially put into each corresponding set of sub-configuration keywords cyclically. In an embodiment, FIG. 2 is a schematic diagram of grouping of sub-configuration keywords. The source port Sport[15:0] has a total of 16 bits and is split in groups of 4 bits. A first 4-bit value Sport[3:0] of the source port Sport[15:0] is put into the first set of sub-configuration keywords, a second 4-bit value Sport[7:4] of the source port is put into the second set of sub-configuration keywords, a third 4-bit value Sport[11:8] of the source port is put into the third set of sub-configuration keywords, and a fourth 4-bit value Sport[15:12] of the source port is put into the fourth set of sub-configuration keywords. Similarly, the destination port Dport[15:0] has a total of 16 bits and is split in groups of 4 bits. A fourth 4-bit value Dport[15:12] of the destination port is put into the first set of sub-configuration keywords, a third 4-bit value Dport[11:8] of the destination port is put into the second set of sub-configuration keywords, a second 4-bit value Dport[7:4] of the destination port is put into to the third set of sub-configuration keywords, and a first 4-bit value Dport[3:0] of the destination port is put into the fourth set of sub-configuration keywords. The IP protocol number Pro[7:0] has a total of 8 bits and is split in groups of 2 bits. A first 2-bit value Pro[1:0] of the IP protocol number is put into the first set of sub-configuration keywords, a second 2-bit value Pro[3:2] of the IP protocol number is put into the second set of sub-configuration keywords, a third 2-bit value Pro[5:4] of the IP protocol number is put into the third set of sub-configuration keywords, and a fourth 2-bit value Pro[7:6] of the IP protocol number is put into the fourth set of sub-configuration keywords. The protocol version Ipver is 1 bit, and the 1-bit protocol version Ipver is put into all the four sets of sub-configuration key words.

The mask includes a source IP address, a destination IP address, a source port, a destination port, an IP protocol number, and a protocol version. Similarly, the source IP address in the mask is split according to the manner of splitting the source IP address in the configuration keyword and is respectively put into four sets of sub-masks, the destination IP address in the mask is split according to the manner of splitting the destination IP address in the configuration keyword and is respectively put into the four sets of sub-masks, the source port in the mask is split according to the manner of splitting the source port in the configuration keyword and is respectively put into the four sets of sub-masks, the destination port in the mask is split according to the manner of splitting the destination port in the configuration keyword and is respectively put into the four sets of sub-masks, the IP protocol number in the mask is split according to the manner of splitting the IP protocol number in the configuration keyword and is respectively put into the four sets of sub-masks, and the protocol version in the mask is respectively put into the four sets of sub-masks in the manner of the protocol version in the configuration keyword.

Mask operation is performed on each set of sub-configuration keywords with the corresponding set of sub-masks to obtain the plurality of sets of masked sub-configuration keywords. Using the foregoing embodiment as an example, mask operation is performed on the first set of sub-configuration keywords and a first set of sub-masks, to set the corresponding bits to 0 after masking, so as to obtain a first set of masked sub-configuration keywords, and mask operation is performed on the second set of sub-configuration keywords and a second sub-mask to obtain a second set of masked sub-configuration keywords. The rest can be deduced by analogy, and four sets of masked sub-configuration keywords are obtained.

Hash operation is performed on each set of masked sub-configuration keywords to obtain the plurality of first Hash values, each first Hash value is used as the storage address, and the set of masked sub-configuration keywords are stored in the storage space corresponding to the storage address, to obtain the storage table in which the plurality of sets of masked sub-configuration keywords are stored. The foregoing embodiment is used as an example for description. A first first Hash value is obtained by performing Hash operation on the first set of masked sub-configuration keywords, the first first Hash value is used as a storage address of a RAM used as a storage table, and the first set of masked sub-configuration keywords is written into the storage table specified by the storage address, to store the first set of masked sub-configuration keywords into the RAM. Four corresponding first Hash values may be obtained after Hash operation is performed on the four sets of masked sub-configuration keywords, that is, four corresponding RAM storage addresses are obtained. The four sets of masked sub-configuration keywords are respectively written into the corresponding storage addresses in the RAM. Based on this solution, 64 mask types can be supported, and storage space corresponding to each storage address can store 64K entries.

If a same first Hash valued is obtained after Hash operation is performed on different masked sub-configuration keywords, that is, the storage addresses are the same, the storage addresses may conflict. Therefore, in an implementation of the present invention, when a same first Hash value is obtained after Hash operation is performed on different masked sub-configuration keywords, the first Hash value is used as the storage address, and the different masked sub-configuration keywords are sequentially stored into the storage address respectively, where the same storage address stores N different masked sub-configuration keywords. N may be set to 8, that is, each storage address may store 8 different masked sub-configuration keywords, which can support 8-level storage address conflict prevention.

The keyword is obtained from the received packet, the keyword in the packet is split into the plurality of sets of sub-keywords, mask operation is performed on each set of sub-keywords with the corresponding set of sub-masks to obtain the corresponding masked sub-keyword, and Hash operation is performed on each set of masked sub-keywords to obtain the plurality of second Hash values. The keyword in the packet includes a source IP address, a destination IP address, a source port, a destination port, an IP protocol number, and a protocol version. The keyword in the packet is split into the plurality of sets of sub-keywords based on a splitting method the same as that of the configuration keyword.

The storage table is queried by the storage address corresponding to each second Hash value, the masked sub-configuration keyword corresponding to the storage address is compared with the sub-keyword, and it is determined that the packet hits the rule if all the sub-keywords are consistent with the corresponding sub-configuration keywords. As described in the foregoing embodiment, the keyword in the packet is split into four sets of sub-keywords, mask operation is respectively performed on the four sets of sub-keywords with corresponding sets of sub-masks to obtain four corresponding sets of masked sub-keywords, and four second Hash values are obtained. The storage table is queried by the storage address that is the same as a first second Hash value, a sub-configuration keyword stored in the storage address is obtained, and the stored sub-configuration keyword is matched with the sub-keyword corresponding to the first second Hash value. If the stored sub-configuration keyword is consistent with the sub-keyword corresponding to the first second Hash value, a first set of hit identifiers are outputted. A second set of hit identifiers, a third set of hit identifiers, and a fourth set of hit identifiers are obtained by analogy. It is determined that the packet hits the rule if the first set of hit identifiers, the second set of hit identifiers, the third set of hit identifiers, and the fourth set of hit identifiers are all outputted.

In the foregoing embodiment, the same storage address stores N different masked sub-configuration keywords. Therefore, when whether the keywords are matched is determined, all of the N sub-configuration keywords need to be matched. The storage table is queried by the storage address that is the same as the first second Hash value, the N masked sub-configuration keywords stored in the storage address are obtained, the sub-keyword corresponding to the first second Hash value is matched with the N masked sub-configuration keywords one by one, and the first set of hit identifiers are outputted if the sub-keyword corresponding to the first second Hash value is consistent with the masked sub-configuration keyword. The second set of hit identifiers, the third set of hit identifiers, and the fourth set of hit identifiers are obtained by analogy. It is determined that the packet hits the rule if the first set of hit identifiers, the second set of hit identifiers, the third set of hit identifiers, and the fourth set of hit identifiers are all outputted. Subsequently, an action on the packet is performed.

Figure 3:
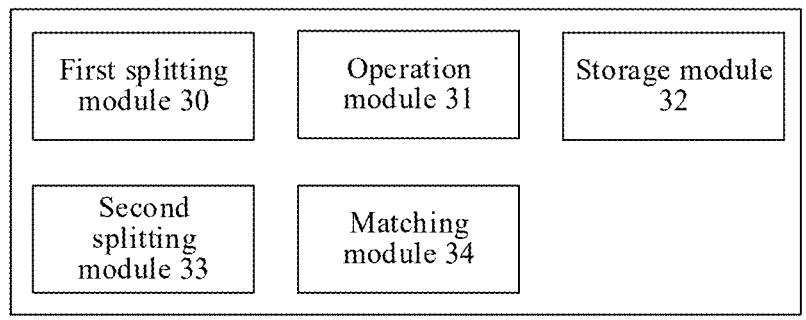
FIG. 3 is a system block diagram of an FPGA-based mask matching system according to an embodiment of the present invention.

As shown in FIG. 3, in an embodiment of the present invention, the present invention provides an FPGA-based mask matching system. The system includes:

a first splitting module 30, configured to obtain a mask and a configuration keyword that are configured by a user, and respectively split the mask and the configuration keyword into a plurality of sets of sub-masks and a plurality of sets of sub-configuration keywords according to a same splitting format;

an operation module 31, configured to perform mask operation on each set of sub-configuration keywords with a corresponding set of sub-masks, to obtain a plurality of sets of masked sub-configuration keywords;

a storage module 32, configured to perform Hash operation on each set of masked sub-configuration keywords to obtain a plurality of first Hash values, use each first Hash value as a storage address, and store the set of masked sub-configuration keywords in storage space corresponding to the storage address, to obtain a storage table in which the plurality of sets of masked sub-configuration keywords are stored;

a second splitting module 33, configured to obtain a keyword from a received packet, split the keyword into a plurality of sets of sub-keywords, perform mask operation on each set of sub-keywords with a corresponding set of sub-masks to obtain corresponding masked sub-keywords, and perform Hash operation on each set of masked sub-keywords to obtain a plurality of second Hash values; and a matching module 34, configured to query the storage table by a storage address corresponding to each second Hash value, compare a masked sub-configuration keyword corresponding to the storage address with the masked sub-keyword, and determine that the packet hits a rule if all the sets of masked sub-keywords are consistent with the corresponding masked sub-configuration keywords.

Although preferred implementations of the present invention have been disclosed for illustrative purposes, a person of ordinary skill in the art should be aware that, various modifications, additions, and replacements may be made without departing from the scope and spirit of the present invention as disclosed by the appended claims.

What is claimed is:

1. An FPGA-based mask matching method, the method comprises:

obtaining a mask and a configuration keyword that are configured by a user, and respectively splitting the mask and the configuration keyword into a plurality of sets of sub-masks and a plurality of sets of sub-configuration keywords according to a same splitting format;

performing mask operation on each set of sub-configuration keywords with a corresponding set of sub-masks, to obtain a plurality of sets of masked sub-configuration keywords;

performing Hash operation on each set of masked sub-configuration keywords to obtain a plurality of first Hash values, using each first Hash value as a storage address, and storing the set of masked sub-configuration keywords in storage space corresponding to the storage address, to obtain a storage table in which the plurality of sets of masked sub-configuration keywords are stored;

obtaining a keyword from a received packet, splitting the keyword into a plurality of sets of sub-keywords, performing mask operation on each set of sub-keywords with a corresponding set of sub-masks to obtain corresponding masked sub-keywords, and performing Hash operation on each set of masked sub-keywords to obtain a plurality of second Hash values; and querying the storage table by a storage address corresponding to each second Hash value, comparing a masked sub-configuration keyword corresponding to the storage address with the masked sub-keyword, and determining that the packet hits a rule if all the sets of masked sub-keywords are consistent with the corresponding masked sub-configuration keywords.

2. The FPGA-based mask matching method according to claim 1, wherein each of the configuration keyword, the mask, and the keyword comprises a source IP address, a destination IP address, a source port, a destination port, an IP protocol number, and a protocol version.

3. The FPGA-based mask matching method according to claim 2, wherein a splitting step of splitting the configuration keyword into the plurality of sets of sub-configuration keywords according to the splitting format comprises:

sequentially grouping source IP addresses in ascending order of bit orders, using M1 bits of the source IP addresses as a set of source IP addresses, and sequentially putting each obtained set of source IP addresses into each corresponding set of sub-configuration keywords cyclically; and the sequentially grouping source IP addresses in ascending order of bit orders, using M1 bits of the source IP addresses as a set of source IP addresses, and sequentially putting each obtained set of source IP addresses into each corresponding set of sub-configuration keywords cyclically comprises:

setting to split the configuration keyword into four sets of sub-configuration keywords; and putting a first 8-bit value of the source IP address into a first set of sub-configuration keywords, putting a second 8-bit value of the source IP address into a second set of sub-configuration keywords, putting a third 8-bit value of the source IP address into a third set of sub-configuration keywords, putting a fourth 8-bit value of the source IP address into a fourth set of sub-configuration keywords, putting a fifth 8-bit value of the source IP address into the first set of sub-configuration keywords, and so on until all bit values of the source IP address are put into corresponding sets of sub-configuration keywords.

4. The FPGA-based mask matching method according to claim 2, wherein a splitting step of splitting the configuration keyword into the plurality of sets of sub-configuration keywords according to the splitting format comprises:

sequentially grouping destination addresses in descending order of bit orders, using M1 bits of the destination addresses as a set of destination IP addresses, and sequentially putting each obtained set of destination IP addresses into each corresponding set of sub-configuration keywords cyclically; and the sequentially grouping destination addresses in descending order of bit orders, using M1 bits of the destination addresses as a set of destination IP addresses, and sequentially putting each obtained set of destination IP addresses into each corresponding set of sub-configuration keywords cyclically comprises:

setting to split the configuration keyword into four sets of sub-configuration keywords; and putting a sixteenth 8-bit value of the destination IP address into a first set of sub-configuration keywords, putting a fifteenth 8-bit value of the destination IP address into a second set of sub-configuration keywords, putting a fourteenth 8-bit value of the destination IP address into a third set of sub-configuration keywords, putting a thirteenth 8-bit value of the destination IP address into a fourth set of sub-configuration keywords, putting a twelfth 8-bit value of the destination IP address into the first set of sub-configuration keywords, and so on until all bit values of the destination IP address are put into corresponding sets of sub-configuration keywords.

5. The FPGA-based mask matching method according to claim 4, wherein the method further comprises:

when a same first Hash value is obtained after Hash operation is performed on different masked sub-configuration keywords, using the first Hash value as the storage address, and sequentially storing the different masked sub-configuration keywords into the storage address respectively, wherein a same storage address stores N different masked sub-configuration keywords.

6. The FPGA-based mask matching method according to claim 5, wherein a step of determining whether the packet hits the rule comprises:

splitting the keyword in the packet into four sets of sub-keywords, respectively performing mask operation on the four sets of sub-keywords with corresponding sets of sub-masks to obtain four corresponding sets of masked sub-keywords, and performing Hash operation on the four sets of masked sub-keywords to obtain four second Hash values;

querying the storage table for a storage address that is the same as a first second Hash value, obtaining N masked sub-configuration keywords stored in the storage address, matching a sub-keyword corresponding to the first second Hash value with the N masked sub-configuration keywords one by one, and outputting a first set of hit identifiers if the sub-keyword corresponding to the first second Hash value is consistent with the masked sub-configuration keyword; and obtaining a second set of hit identifiers, a third set of hit identifiers, and a fourth set of hit identifiers by analogy, and determining that the packet hits the rule if the first set of hit identifiers, the second set of hit identifiers, the third set of hit identifiers, and the fourth set of hit identifiers are all outputted.

7. The FPGA-based mask matching method according to claim 2, wherein a splitting step of splitting the configuration keyword into the plurality of sets of sub-configuration keywords according to the splitting format comprises:

sequentially grouping source ports in ascending order of bit orders, using M2 bits of the source ports as a set of source port addresses, and sequentially putting each obtained set of source port addresses into each corresponding set of sub-configuration keywords cyclically; and the sequentially grouping source ports in ascending order of bit orders, using M2 bits of the source ports as a set of source port addresses, and sequentially putting each obtained set of source port addresses into each corresponding set of sub-configuration keywords cyclically comprises:

setting to split the configuration keyword into four sets of sub-configuration keywords; and putting a first 4-bit value of the source port into a first set of sub-configuration keywords, putting a second 4-bit value of the source port into a second set of sub-configuration keywords, putting a third 4-bit value of the source port into a third set of sub-configuration keywords, and putting a fourth 4-bit value of the source port into a fourth set of sub-configuration keywords.

8. The FPGA-based mask matching method according to claim 2, wherein a splitting step of splitting the configuration keyword into the plurality of sets of sub-configuration keywords according to the splitting format comprises:

sequentially grouping destination ports in descending order of bit orders, using M2 bits of the destination ports as a set of destination port addresses, and sequentially putting each obtained set of destination port addresses into each corresponding set of sub-configuration keywords cyclically; and the sequentially grouping destination ports in descending order of bit orders, using M2 bits of the destination ports as a set of destination port addresses, and sequentially putting each obtained set of destination port addresses into each corresponding set of sub-configuration keywords cyclically comprises:

setting to split the configuration keyword into four sets of sub-configuration keywords; and putting a fourth 4-bit value of the destination port into a first set of sub-configuration keywords, putting a third 4-bit value of the destination port into a second set of sub-configuration keywords, putting a second 4-bit value of the destination port into a third set of sub-configuration keywords, and putting a first 4-bit value of the destination port into a fourth set of sub-configuration keywords.

9. The FPGA-based mask matching method according to claim 2, wherein a splitting step of splitting the configuration keyword into the plurality of sets of sub-configuration keywords according to the splitting format comprises:

setting to split the configuration keyword into four sets of sub-configuration keywords;

putting a first 2-bit value of the IP protocol number into a first set of sub-configuration keywords, putting a second 2-bit value of the IP protocol number into a second set of sub-configuration keywords, putting a third 2-bit value of the IP protocol number into a third set of sub-configuration keywords, and putting a fourth 2-bit value of the IP protocol number into a fourth set of sub-configuration keywords; and putting the protocol version into all the four sets of sub-configuration keywords.

10. An FPGA-based mask matching system, the system comprises:

a first splitting module, configured to obtain a mask and a configuration keyword that are configured by a user, and respectively split the mask and the configuration keyword into a plurality of sets of sub-masks and a plurality of sets of sub-configuration keywords according to a same splitting format;

an operation module, configured to perform mask operation on each set of sub-configuration keywords with a corresponding set of sub-masks, to obtain a plurality of sets of masked sub-configuration keywords;

a storage module, configured to perform Hash operation on each set of masked sub-configuration keywords to obtain a plurality of first Hash values, use each first Hash value as a storage address, and store the set of masked sub-configuration keywords in storage space corresponding to the storage address, to obtain a storage table in which the plurality of sets of masked sub-configuration keywords are stored;

a second splitting module, configured to obtain a keyword from a received packet, split the keyword into a plurality of sets of sub-keywords, perform mask operation on each set of sub-keywords with a corresponding set of sub-masks to obtain corresponding masked sub-keywords, and perform Hash operation on each set of masked sub-keywords to obtain a plurality of second Hash values; and a matching module, configured to query the storage table by a storage address corresponding to each second Hash value, compare a masked sub-configuration keyword corresponding to the storage address with the masked sub-keyword, and determine that the packet hits a rule if all the sets of masked sub-keywords are consistent with the corresponding masked sub-configuration keywords.

* * * * *